United States Patent Office 2,766,283
Patented Oct. 9, 1956

2,766,283

PREPARATION OF FERTILIZER COMPOSITIONS

Eugene Turner Darden, New Castle, Del., assignor to E. I. du Pont de Nemours and Company, Wilmington, Del., a corporation of Delaware No Drawing. Application September 12, 1951,
Serial No. 246,341

7 Claims. (Cl. 260—553)

This invention relates to a process for preparing fertilizer compositions derived from urea and formaldehyde, and more particularly, it relates to a process for preparing urea-formaldehyde fertilizer compositions in which the nitrogen content becomes available gradually and over a long period of time.

Recent work has indicated that superior nitrogenous fertilizers can be prepared from urea and formaldehyde. The advantage of these compositions stems from the fact that their nitrogen content is for the most part insoluble in water, yet it becomes available gradually and over an extended period of time for the promotion of plant growth. In order to be completely satisfactory, at least 60% of the nitrogen content of these fertilizers should be in insoluble form, as determined in accordance with the A. O. A. C. test (A. O. A. C. "Official Methods of Analysis," 7th Ed., p. 15, Test No. 2.34). At the same time, at least 45% of this insoluble nitrogen, and preferably at least 50% thereof, should become available for plant nutrition within a period of six months. An indication of the availability may be obtained by determining the percentage of the "insoluble nitrogen" which dissolves when a sample of 0.25 gram of the product is heated to 100° C. for 30 minutes in 250 milliliters of neutralized water. The percentage figure thus obtained is called the "availability index" and is approximately equivalent to the amount of insoluble nitrogen which nitrifies during the first six months in the soil.

Although the advantages of these fertilizer compositions have been appreciated, no method has been available whereby they could be prepared in an economical manner and in consistently high quality. Certain of the prior art products have exhibited the desired insolubility and availability, provided they were crushed down, for instance, to a fine powder which would pass through a 100-mesh screen, but such a product is not desirable because of its dusting characteristics.

It is therefore an object of this invention to provide a process for preparing superior urea-formaldehyde fertilizer compositions. It is a further object of this invention to provide a process for preparing fertilizer compositions containing at least 60% of their nitrogen in an insoluble form and having an "availability index" of at least 45%. It is a particular object of this invention to provide a process for preparing fertilizer compositions of these characteristics without having to grind the product down to a fine powder. Other objects of the invention will appear hereinafter.

In accordance with this invention, it has been discovered that superior urea-formaldehyde fertilizer compositions can be prepared by reacting formaldehyde with a large excess of urea and in the presence of large quantities of water while subjecting the reaction mixture to only a mild or moderate amount of agitation. The mol ratio of urea to formaldehyde is within the range of from 1.5:1 to 4.5:1, and is preferably within the range of from 1.8:1 to 2.6:1. The mol ratio of water to formaldehyde is from 20:1 to 80:1, and is preferably from 25:1 to 50:1. The amount of agitation is such that the urea-formaldehyde particles, which initially precipitate in an average particle size of from 2 to 6 microns, are caused to agglomerate until the average particle size is within the range of from 20 to 200 microns.

The reaction is brought about by causing the urea and formaldehyde to react at a temperature of from 20° to 80° C. and at a pH of from 1 to 6. Preferably the temperature is within the range of from 35° to 65° C. and the pH is within the range of from 2.5 to 4.5. The urea, either in crystal form or in the form of an aqueous solution, is mixed with formaldehyde in the presence of the requisite amount of water and in the stipulated ratio of urea to formaldehyde and allowed to react under mild or moderate conditions of agitation. It is satisfactory, for instance, to employ an amount of agitation which is just about sufficient to prevent settling of the precipitated solids. The reaction time may vary from several minutes to several hours, depending upon the temperature and pH conditions selected and upon the exact nature of the product which it is desired to produce. At the conclusion of the reaction, the product is neutralized and separated from the filtrate, either by filtration, by centrifuging, or by other suitable methods. Alternately, neutralization of the wet cake may be carried out after separation from the filtrate. This is done by adding $CaCO_3$ or other suitable material and tumbling. The product is then granulated in from 75% to 200% of water, based upon the dry weight of the product, and dried.

The properties of the ultimate fertilizer composition are entirely dependent upon the combination of reaction conditions employed during the preparation, and these various reaction conditions are very closely interrelated with one another. Without wishing to be bound by any theory, it is believed that the most desirable fertilizer compositions are the polymethylene polyureas in which from 3 to 5 urea residues are connected together by means of methylene groups. The mol ratio of urea to formaldehyde in these final products is in the range of from about 1.1:1 to 1.6:1.

Proper control of the agitation is extremely important in preparing satisfactory fertilizer compositions on a commercial scale. The urea-formaldehyde particles when first formed under the conditions disclosed herein have an average particle size of from 2 to 6 microns. The product in this form is very slimy in nature and almost impossible to filter or centrifuge in a practical manner. If this slimy precipitate is subjected to violent agitation, or even to relatively strong agitation, there is no decrease in its slimy properties, and in fact it may become even more difficult to centrifuge, apparently as the result of the mechanical break-up of the particles. On the other hand, if the precipitate, either during or subsequent to its formation, is subjected to only a mild amount of agitation, it has been found that the particles will agglomerate to give a product which can be filtered or centrifuged in a practical manner. Preferably, the precipitate is subjected to mild agitation both during and subsequent to its formation. With the proper amount and kind of agitation, the small particles, which form initially, agglomerate into particles having an average diameter of from 20 to 200 microns. Generally speaking, the particles tend to become more uniform in size as the agitation time is increased.

Various techniques such as the use of stirrers, paddles, baffles, shaking, vibration, or the like, or bubbling a gas through the reaction mixture, or combinations of these techniques, may be employed to effect the required agitation. The amount of agitation, for example, should be just sufficient to create a gentle swirl in the reaction mixture, or to prevent settling of the precipitated product. The exact amount of agitation will be illustrated in the examples, which show the operation of the process in particular kinds of reactors.

The amount of agitation is not only of critical importance in connection with the filtration or centrifuging step, but is also of the greatest importance in connection with the subsequent granulation step. The granulation should be carried out in the presence of from 75% to 200% of water, based upon the dry weight of the product. Accordingly, the product which is removed from the filter or centrifuge should contain just the right amount of water for the granulation step, and this result can only be achieved if the material introduced into the filter or centrifuge has been prepared under the proper conditions of agitation. Preferably the granulation is carried out in the presence of from 100% to 175% of water, based upon the dry weight of the product.

The pH of the reaction mixture can be adjusted by the addition of any suitable organic or inorganic acid or acid salt or combination thereof. Nitric acid, sulfuric acid, or phosphoric acid is preferred, since these acids are economical, readily available, and contribute to the ultimate fertilizing properties of the compositions.

The neutralization can also be carried out with any of a number of different organic or inorganic bases or combinations thereof, although it is generally preferred to employ a base which will remove the anion of the acid from solution and thus prevent undue buildup thereof in systems employing recycled streams. For example, when sulfuric acid has been employed to adjust the pH to the proper reaction conditions, it is preferred to neutralize with calcium carbonate, which removes the sulfate ion from solution by precipitating it as calcium sulfate. Alternately, ammonia, alkali metal or alkaline earth metal hydroxides, carbonates or bicarbonates, or the like may be employed. The neutralization step is vital as a step in the production of compositions which will not change in their solubility characteristics or fertilizing properties during storage or with the passage of time.

The reaction may be carried out in a batchwise manner, or it may be carried out continuously or semicontinuously. For large-scale installations, a batch reactor or a continuous, cascade or tubular reactor is preferred. A constant environment reactor may also be employed, although control of the reaction tends to be more difficult under constant environment conditions than it does under batchwise conditions. The process may be operated, for instance, by continuously introducing into a tubular reactor three streams, namely, a filtrate stream, a urea solution and a formaldehyde solution, together with the requisite amount of acid to produce the desired pH.

If desired, the reaction may be carried out in the presence of formamide, acetamide, propionamide, or other agents which may act as chain stoppers or telogens, and prevent the formation of urea-formaldehyde condensation products having an unduly high molecular weight.

Since a large excess of urea is employed in the reaction, there is a large amount of urea contained in the filtrate after the product has been separated out. These filtrate solutions may be used as such for the manufacture of other fertilizer compositions, or the urea may be recovered therefrom in various ways. Preferably, however, the filtrate is used over again in the present process, sufficient amounts of urea, formaldehyde and/or water being added to produce the desired mol ratios. Since these recycle streams will contain urea and soluble urea-formaldehyde reaction products, the amounts of urea and formaldehyde, both free and in combined form, as well as the amount of water, must be taken into consideration in determining the additional quantities of ingredients which must be added to the system. It is advisable to be sure that the recycle streams are free of slimy materials which might cause difficulties in subsequent filtration or centrifuging.

The formaldehyde is preferably introduced in the form of the commercially available solution which contains about 37% of formaldehyde, but more dilute solutions, more concentrated solutions, solid formaldehyde, paraformaldehyde, trioxane, or reacted forms of formaldehyde such as hexamethylenetetramine, dimethylol urea, higher methylol ureas such as those disclosed in Re. 23,174, or the like, may also be employed. Frequently, the formaldehyde solutions contain a sufficient amount of formic acid so that no additional acid is required in order to produce the desired pH.

The urea may be added either as a solid or as an aqueous solution. Such aqueous solutions are frequently available in connection with a plant which manufactures urea.

The granulation step may be carried out by subjecting the centrifuged product to tumbling in a rotating drum or in other suitable granulating apparatus. If desired, the product may be screened prior to being introduced into the granulator. Such a screening operation has the effect of controlling the size of the granules produced in the granulation step. Screening is not necessary, however, if the product is removed from the centrifuge by a plow or other device which acts to break up the centrifuge cake. The length of time required for granulation is largely dependent upon the water content of the material being granulated. In general, the higher the water content, the less time is required for granulation. When the water content is about 130% to 150%, the granulation time is about 12 to 20 minutes, whereas when the water content is 175%, the granulation time is reduced to about 5 minutes.

The granulation step serves to pack or compact the loose agglomerates into firmer spheres or balls and tends to avoid caking of the product. If the granulation is carried out for too long, or if it is carried out too violently, the agglomerates become either too large or else too pasty. The effectiveness of the granulation step is very closely related to the manner in which the filtration or centrifuging step was carried out, because of the importance of the water content of the product entering the granulation step. The filtration or centrifuging, in turn, is entirely dependent upon the manner in which the synthesis step was carried out, since a product which exists in the form of only very small particles is almost impossible to filter or centrifuge down to a water content which is suitable for the granulation step. In general, better granulation is obtained when the filter or centrifuge cake is washed very little, or not at all. This apparently leaves some of the urea and soluble urea-formaldehyde reaction products in the cake and these are believed to act as binders in the granulation step.

After the product leaves the granulator it is subjected to a drying operation. Preferably, the drying is carried out in a co-current drier, using heated air. In a typical drier, the air enters at about 200° to 260° C. and leaves at a temperature of about 100° to 125° C. Preferably, the dried product should contain 3% of water or less. If desired, the product may be passed through a flash drier before it is passed into the co-current drier. Care should be exercised to avoid overheating either in the drying operation or in any subsequent steps, in order that the fertilizer properties of the product may not be adversely affected.

The nitrogen content of the fertilizer materials prepared by the present process is generally within the range of about 39% to 41%. The free urea content of the fertilizer compositions is generally rather low and can be further reduced, if desired, by subjecting the filter or centrifuge cake to washing. If the process is being carried out in a continuous manner and the wash liquor is being recycled in order to utilize its content of urea and soluble urea-formaldehyde compounds, it is sometimes necessary to subject the recycle stream to evaporation so as to prevent an undue accumulation of water in the system.

Certain embodiments of the invention will be illustrated in the following examples:

*Example 1.*—Urea and formaldehyde were reacted in a mol ratio of two mols of urea to one mol of formaldehyde. The urea was introduced in the form of a 20% aqueous solution and the formaldehyde in a 37% aqueous solution, so that the mol ratio of water to formaldehyde was about 29.5:1. The pH was adjusted to 4.0 by adding dilute sulfuric acid and the reaction mixture was heated to a temperature of about 60° to 70° C. for one hour, with agitation sufficient to prevent settling of the precipitated solids. The mixture was then neutralized by adding calcium carbonate and cooled to about 40° C. with agitation. The product was then centrifuged, dried at 70° C., crushed and screened to obtain a product all of which passed through a 20-mesh screen and no more than 25% of which passed through an 80-mesh screen. The resulting product was found to have about 68% of its nitrogen in the insoluble form, as determined by the A. O. A. C. test, and had an "availability index" of 66%.

*Example 2.*—Urea and formaldehyde were reacted in the presence of water and in a mol ratio of urea:formaldehyde:water of 2.4:1:49. The reaction was allowed to proceed with mild agitation for about 3½ to 5 minutes at a temperature of 31° C. and a pH of 3.0. The product had an insoluble nitrogen content of 73.6% and an "availability index" of 59.9%.

Several runs such as that described in Example 2 were made in which the temperature, the pH, and/or the mol ratios were changed. These results, along with the results obtained in Example 2, are set forth in the following table:

TABLE

| Temp. | pH | Mol Ratio U:F:H$_2$O | Insoluble Nitrogen, Percent | Availability Index |
|---|---|---|---|---|
| 31° C | 3 | 2.4/1/49 | 73.6 | 59.9% (Example 2). |
| 40°–48° C | 3 | 2.4/1/50 | 72.3 | 63.5%. |
| 40° C | 3.5 | 2.4/1/49 | 73.6 | 59.9%. |
| 50° C | 4 | 2.6/1/45 | 73.4 | 56.2%. |

*Example 3.*—The effect of the amount of agitation on the size of the particles produced is shown by a series of runs made in laboratory apparatus and using a small rotary electric stirrer. The runs were made at a pH of about 4 to 5, at a temperature of about 50° to 65° C., and at a urea to formaldehyde ratio of 2:1. At the end of about 2 hours, the product was neutralized to a pH of 6 by means of calcium carbonate and centrifuged at 1475 G in a preheated centrifuge. The average size of the particles when they first precipitated was about 3.6 microns. As shown by the following figures, the effect of decreasing the amount of agitation, within the specified range, is to increase the average size of the particles in the product at the end of the run.

| Rate of Agitation | Average Particle Size |
|---|---|
| 400 R. P. M. | 50 microns. |
| 150 R. P. M. | 110 microns. |
| 100 R. P. M. | 185 microns. |

*Example 4.*—Urea and formaldehyde were reacted in a mol ratio of urea:formaldehyde:water of 2.03:1:30.5. The initial temperature was 40° C. and the temperature rose during the course of the reaction to 48° C. The formaldehyde was introduced in the form of 37% formaldehyde solution and the pH was maintained within the range of 3.0±0.1. The reaction was carried out in a stirred kettle which was 18 inches high and had a diameter of 14 inches. The kettle was provided with an agitator consisting of a flat paddle blade 10 inches long and 1¾ inches wide and mounted near the bottom of a vertical shaft. The desired amount of agitation was produced by rotating this paddle at 60 to 70 R. P. M. At the end of a reaction period of about 30 minutes, the reaction mixture was neutralized with calcium carbonate, and filtered until it contained 147% of water, based upon the dry weight of the product. The granulation was carried out by tumbling the filtered product for about 20 minutes, at the end of which time, the product was dried in a co-current drier with the air being introduced at about 200° C. and leaving at about 110° C. The dried product, which contained slightly less than 3% of water, had an insoluble nitrogen content of 67.8% and an "availability index" of 70.0%.

*Example 5.*—A series of 13 batch runs was made, the filtrate from each run being recycled to the next. The fifth run of this series was carried out as follows.

To the reaction vessel were charged:

|  | Grams |
|---|---|
| Urea (2.39 mols) | 143.5 |
| 35.1% HCHO solution (1.69 mols) | 145 |
| Filtrate from the fourth run | 1509 |
| Water | 259 |

The above charge is equivalent to:

|  | Grams |
|---|---|
| Urea (4.92 mols) | 295 |
| 100% formaldehyde (2.46 mols) | 74 |
| Water (93.6 mols) | 1687 |

The pH was adjusted to 4.0 by adding dilute sulfuric acid and the reaction mixture was heated to 60° to 62° C. for one hour with agitation sufficient to prevent settling of the precipitated solids. The mixture was then neutralized by adding calcium carbonate, and cooled to 40° C. The product was then centrifuged at 1475 G, giving 334 g. wet cake and 1648 g. filtrate. The wet cake was dried at 70° C., giving a dry cake weighing 126 g. (165% water in wet cake, calculated on dry basis). The dried product was crushed and screened to obtain a product all of which passed a 20-mesh screen and no more than 25% of which passed through an 80-mesh screen. This product was found to contain 40.0% nitrogen, 72.5% of which was in an insoluble form, and had an "availability index" of 54.4. The free urea content by the urease method of determination was 6.2%. The 1648 g. of filtrate obtained from the centrifuge was charged to the sixth run.

The process of the present invention has many advantages, since the use of a large excess of urea, combined with the use of a large excess of water makes it possible to control the reaction in such a way that the desired product is readily obtained. In contrast thereto, the prior art processes had to be controlled within such narrow limits that, as a practical matter, high-quality fertilizers could not be made consistently on a commercial scale. Furthermore, the best process known heretofore was, in effect, a two-step process in which urea and formaldehyde were reacted under basic conditions to produce a feed solution, which was then acidified in a second step and reacted under carefully controlled conditions. Hence, the present process is an improvement over this prior art process not only because it makes possible the preparation of consistently high-quality product, but also because it eliminates one whole step from the prior method.

For the construction of large-scale installations, wood is a satisfactory material of construction, although other material such as steel, stainless steel, glass, enamel, stoneware or the like may also be employed. The reaction vessel may be jacketed, if desired, although it is usually sufficient merely to provide an external heat exchanger for adjustment of the starting temperature.

It has been observed that the time required for granulation is greatly affected by the temperature, as well as by the water content of the compositions. In general, within the range of from 20° C. to 80° C., the higher the temperature, the shorter is the time required for granulation. For example, compositions which contain 100% or 120% of water on a dry basis may not granulate at room temperature in reasonable times, but by raising the temperature to 50° C., or maybe even up as high as 80° C., satisfactory granulation is obtained in as little as 5 to 10 minutes. Various granulating agents, such as starch or free urea, may be used with good results. If the water content of the product as it is removed from the filter or centrifuge is lower than is desired for granulation, more water may be added, or, if desired, a portion of the filtrate itself may be used.

The products resulting from the process of the present invention may be employed as such, or, if desired, they may be admixed with any of the other known fertilizer compositions or ingredients. If desired, certain of these ingredients, such as nitrates, potassium salts, or phosphates, may be present during the reaction itself, so that complete fertilizer compositions may be produced in one step.

The urea-formaldehyde compositions prepared by the process described herein may be employed not only as fertilizer compositions, but may also be employed as feed supplements for cattle or other ruminants. When the compositions are to be employed as feeds, it is advisable that the mol ratio of urea to formaldehyde in the reaction system be relatively high, for example, 3 to 1 or 4 to 1.

Since many modifications and alterations of the processes described herein can be made by those skilled in the art without departing from the spirit and scope of the invention, it is not intended that the invention should be restricted except by the following claims.

I claim:

1. A process for preparing a urea-formaldehyde composition having an insoluble nitrogen content of at least 60% and an availability index of at least 45% which comprises bringing together urea and formaldehyde in a mol ratio of from 1.5 to 4.5 mols of urea per mol of formaldehyde and in the presence of 20 to 80 mols of water per mol of formaldehyde at a temperature of 20° to 80° C. maintaining the pH of the mixture at from 1 to 6 by adding acid thereto, allowing the urea and formaldehyde to react under these conditions for a period of time within the range of 3.5 minutes to 2 hours while subjecting the reaction mixture to mild agitation sufficient to prevent settling of the precipitated solids, neutralizing the reaction mixture to a pH of at least 6.0, thereafter separating by filtration a precipitated urea-formaldehyde product from the reaction mixture, recycling the resulting filtrate with make-up urea and formaldehyde under the same conditions, and drying the resultant unwashed precipitated urea-formaldehyde product.

2. A process according to claim 1 in which the mol ratio of urea to formaldehyde is within the range of from 1.8:1 to 2.6:1.

3. A process according to claim 1 in which the mol ratio of water to formaldehyde is within the range of from 25:1 to 50:1.

4. A process according to claim 1 in which the agitation employed is gentle enough to permit an increase in the particle size of the urea-formaldehyde product from the average size to 2 to 6 microns, at which it initially precipitates, up to an average size within the range of from 20 to 200 microns.

5. A process according to claim 1 in which the precipitated urea-formaldehyde product is separated from the reaction mixture by filtering until the water content is reduced to a level within the range of from 75% to 200%, based upon the dry weight of the product and the filtered product is thereafter subjected to granulation and drying.

6. A process according to claim 1 in which calcium carbonate is used to neutralize the reaction mixture to a pH of at least 6.0.

7. A process for preparing a urea-formaldehyde fertilizer composition having an insoluble nitrogen content of at least 60% and an availability index of at least 50% which comprises bringing together urea and formaldehyde in a mol ratio of from 1.8 to 2.4 mols of urea per mol of formaldehyde and in the presence of from 25 to 50 mols of water per mol of formaldehyde at a temperature within the range of from 35° to 65° C. maintaining the pH of the mixture at from 2.5 to 4.5 by addition of sulfuric acid thereto, allowing the urea and formaldehyde to react under these conditions for a period of time within the range of 3.5 minutes to 2 hours while subjecting the reaction mixture to sufficiently mild agitation to increase the particle size of the urea-formaldehyde product from the average size of 2 to 6 microns, at which it initially precipitates, up to an average size within the range of 20 to 200 microns, neutralizing the reaction mixture with calcium carbonate to a pH of at least 6.0, separating the urea-formaldehyde product from the reaction mixture by filtering, recycling the resulting filtrate with make-up urea and formaldehyde under the same conditions and granulating and drying the unwashed urea-formaldehyde product.

References Cited in the file of this patent

UNITED STATES PATENTS

| Number | Name | Date |
|---|---|---|
| 1,883,718 | Grether | Oct. 18, 1932 |
| 2,000,152 | Walker | May 7, 1935 |
| 2,110,943 | Remensnyder | Mar. 15, 1938 |
| 2,261,556 | Marsh et al. | Nov. 4, 1941 |
| 2,415,705 | Rohner et al. | Feb. 11, 1947 |
| 2,592,809 | Kralovec et al. | Apr. 15, 1952 |
| 2,644,806 | Kise | July 7, 1953 |

FOREIGN PATENTS

| Number | Country | Date |
|---|---|---|
| 241,647 | Switzerland | Aug. 1, 1946 |
| 528,582 | Germany | July 9, 1931 |
| 600,194 | Great Britain | Apr. 2, 1948 |
| 785,765 | France | May 27, 1935 |
| 956,459 | France | Aug. 8, 1949 |

OTHER REFERENCES

Vass: "British Plastics," vol. 10 (1938), pp. 115–118.
Chem. Abst., vol. 35 (1941), p. 3971.
Clark et al.: "Ind. Eng. Chem.," vol. 40 (1948), pp. 1178–83.
Kadowaki "Bul. Chem. Soc. Japan," vol. 11 (1936), 256.